(12) United States Patent
Burdick

(10) Patent No.: US 12,723,663 B1
(45) Date of Patent: Sep. 1, 2026

(54) BALL VALVE WITH FLEXIBLE ARM AND DETENTS FOR MAINTAINING VALVE OPEN OR CLOSED

(71) Applicant: Brett R. Burdick, Knoxville, TN (US)

(72) Inventor: Brett R. Burdick, Knoxville, TN (US)

( * ) Notice: Subject to any disclaimer, the term of this patent is extended or adjusted under 35 U.S.C. 154(b) by 0 days.

(21) Appl. No.: 19/238,759

(22) Filed: Jun. 16, 2025

(51) Int. Cl.
*F16K 5/06* (2006.01)
*F16K 31/60* (2006.01)
*F16K 35/04* (2006.01)

(52) U.S. Cl.
CPC ............ *F16K 5/0647* (2013.01); *F16K 31/60* (2013.01); *F16K 35/04* (2013.01)

(58) Field of Classification Search
CPC ......... F16K 5/0647; F16K 31/60; F16K 35/04
See application file for complete search history.

(56) References Cited

U.S. PATENT DOCUMENTS 681,183 A * 8/1901 Bessey et al. .......... F16K 35/04 251/297
1,406,191 A 2/1922 Irving
1,800,231 A * 4/1931 Slater ...................... F16K 35/04 251/297
2,784,934 A * 3/1957 Paulius, Jr. ............. F16K 35/04 251/297
3,542,338 A 11/1970 Domer
3,762,682 A 10/1973 Franck
5,593,135 A 1/1997 Lester et al.
6,260,819 B1 7/2001 Ovsepyan
6,837,480 B1 1/2005 Carlson
D757,217 S 5/2016 Park
10,794,514 B2 10/2020 Huddleston
10,859,184 B2 12/2020 Taylor et al.
11,680,660 B2 6/2023 Adams et al.
11,796,080 B2 10/2023 Stogdill et al.
11,879,581 B2 1/2024 Koller et al.
2005/0127317 A1 6/2005 Rebello
2012/0091377 A1* 4/2012 Tips .................... B05B 12/0022 251/231
2015/0369391 A1* 12/2015 Fang ......................... F16K 5/06 251/279
2021/0095770 A1* 4/2021 Liu ......................... F16K 35/10

FOREIGN PATENT DOCUMENTS

JP H07119848 A 5/1995

OTHER PUBLICATIONS

Printables, 100mm / 4" Ball Valve Type Non-Clog Blast Gate for Workshop Dust Extraction Network (Sep. 1, 2020).
Printables, 100mm / 4" Truncated Ball Valve Type Non-Clog Blast Gate for Workshop Dust Extraction Network (Jun. 9, 2024).

* cited by examiner

*Primary Examiner* — John Bastianelli
(74) *Attorney, Agent, or Firm* — Luedeka Neely, P.C.

(57) ABSTRACT

A ball valve for low pressure air flow environments that locks in the open and closed positions and can be operated with one hand. The ball valve includes a valve body having an aperture located on the valve body and a ledge adjacent the aperture and extending outwardly from the valve body; a ball including a stem positionable in the aperture for rotatably positioning the ball relative to the valve body between an open condition and a closed condition; and a handle connectable to the ball to rotate the ball relative to the valve body, the handle including an arm having a catch at a free end thereof.

3 Claims, 14 Drawing Sheets

BALL VALVE WITH FLEXIBLE ARM AND DETENTS FOR MAINTAINING VALVE OPEN OR CLOSED

FIELD

This disclosure relates to the field of ball valves. More particularly, the disclosure relates to an improved ball valve for low pressure air flow environments that locks in the open and closed positions and can be operated with one hand.

BACKGROUND

Improvement is desired in the structure of ball valves for low pressure air flow environments. Ball valves are quarter-turn shut-off or isolation valves that utilize a spherical ball with a central flow bore. Flow is controlled by controlling the orientation of the flow bore relative to entrance and exit flow passages of a valve body. In the closed position the flow bore is sealed from the flow passages of the valve body. In the open position, a quarter-turn, the flow bore is rotated 90 degrees from the closed position and the flow bore is aligned with the flow passages of the valve body.

Many ball valves do not lock in the open or closed positions. Lock-out devices exist for use with ball valves, usually for high air flow uses, but these are cumbersome to use and do not enable one-handed operation. While such valves are acceptable for use conditions where the ball valve is only rarely changed between open/closed positions, such valves are ill-suited for conditions where the valve is operated frequently during a work session, such as occurs when the ball valve is utilized in a workshop dust collection system.

In a typical workshop using a dust collection system having several workstations, the dust collection system is routed to each of the workstations. Each workstation has a ball valve to control whether the system is on at that station or not. Typically, only one workstation is operated at a time and the ball valve is opened while working at that workstation and thereafter maintained closed. During a work session the ball valves may be opened or closed numerous times to collect dust as needed. It is desirable that the ball valve be operable with one hand.

Need thus exists for a ball valve for use in controlling flow of air through conduits in low pressure air flow environments, such as used in workshop dust collection systems. The present disclosure addresses this specific scenario. The disclosed embodiment is also suitable as a valve for numerous other applications.

SUMMARY

The present disclosure advantageously provides a ball valve. Advantages of ball valves according to the disclosure are that they are lockable in the open and closed conditions, and can be operated with one hand.

In one aspect, a ball valve according to the disclosure includes a valve body including a flow inlet and a flow outlet across from the flow inlet and an aperture located on the valve body at a location between the flow inlet and the flow outlet, the aperture having a first curved ledge adjacent the aperture and extending outwardly from the valve body and a second curved ledge adjacent the aperture and radially spaced from the first ledge and extending outwardly from the valve body.

The ball valve also includes a ball including an outer surface and flow passage through the ball, the ball including a stem positionable in the aperture for rotatably positioning the ball relative to the valve body between an open condition with the flow passage of the ball aligned with and open to and in fluid communication with the flow inlet and the flow outlet of the valve body and a closed condition with the flow passage of the ball not aligned with and not in fluid communication with the flow inlet and the flow outlet of the valve body.

A handle of the ball valve is connectable to the ball to rotate the ball relative to the valve body. The handle includes a first curved flexible arm having a catch at a free end thereof and a second curved flexible arm radially spaced from the first curved flexible arm and having a catch at a free end thereof.

When the ball valve is in the open condition the catch of the first curved flexible arm lockingly engages a first end of the first curved ledge and the catch of the second curved flexible arm lockingly engages a first end of the second curved ledge.

When the ball valve is in the closed condition the catch of the first curved flexible arm lockingly engages a second end of the first curved ledge and the catch of the second curved flexible arm lockingly engages a second end of the second curved ledge.

In another aspect, a ball valve according to the disclosure includes a valve body including a flow inlet and a flow outlet across from the flow inlet and an aperture located on the valve body at a location between the flow inlet and the flow outlet, the aperture having a curved ledge adjacent the aperture and extending outwardly from the valve body.

The ball valve also includes a ball having an outer surface and flow passage through the ball, the ball including a stem positionable in the aperture for rotatably positioning the ball relative to the valve body between an open condition with the flow passage of the ball aligned with and open to and in fluid communication with the flow inlet and the flow outlet of the valve body and a closed condition with the flow passage of the ball not aligned with and not in fluid communication with the flow inlet and the flow outlet of the valve body A handle is connectable to the ball to rotate the ball relative to the valve body, the handle including a curved flexible arm having a catch at a free end thereof. When the ball valve is in the open condition the catch of the curved flexible arm lockingly engages a first end of the curved ledge. When the ball valve is in the closed condition the catch of the curved flexible arm lockingly engages a second end of the curved ledge.

In yet another aspect, a ball valve according to the disclosure includes a valve body including a flow inlet and a flow outlet across from the flow inlet and an aperture located on the valve body at a location between the flow inlet and the flow outlet, the aperture having a ledge adjacent the aperture and extending outwardly from the valve body.

The ball valve also has a ball including an outer surface and flow passage through the ball, the ball including a stem positionable in the aperture for rotatably positioning the ball relative to the valve body between an open condition with the flow passage of the ball aligned with and open to and in fluid communication with the flow inlet and the flow outlet of the valve body and a closed condition with the flow passage of the ball not aligned with and not in fluid communication with the flow inlet and the flow outlet of the valve body.

A handle is connectable to the ball to rotate the ball relative to the valve body, the handle including an arm having a catch at a free end thereof when the ball valve is in the open condition the catch of the arm lockingly engages a first end of the ledge. When the ball valve is in the closed condition the catch of the arm lockingly engages a second end of the ledge.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1A:
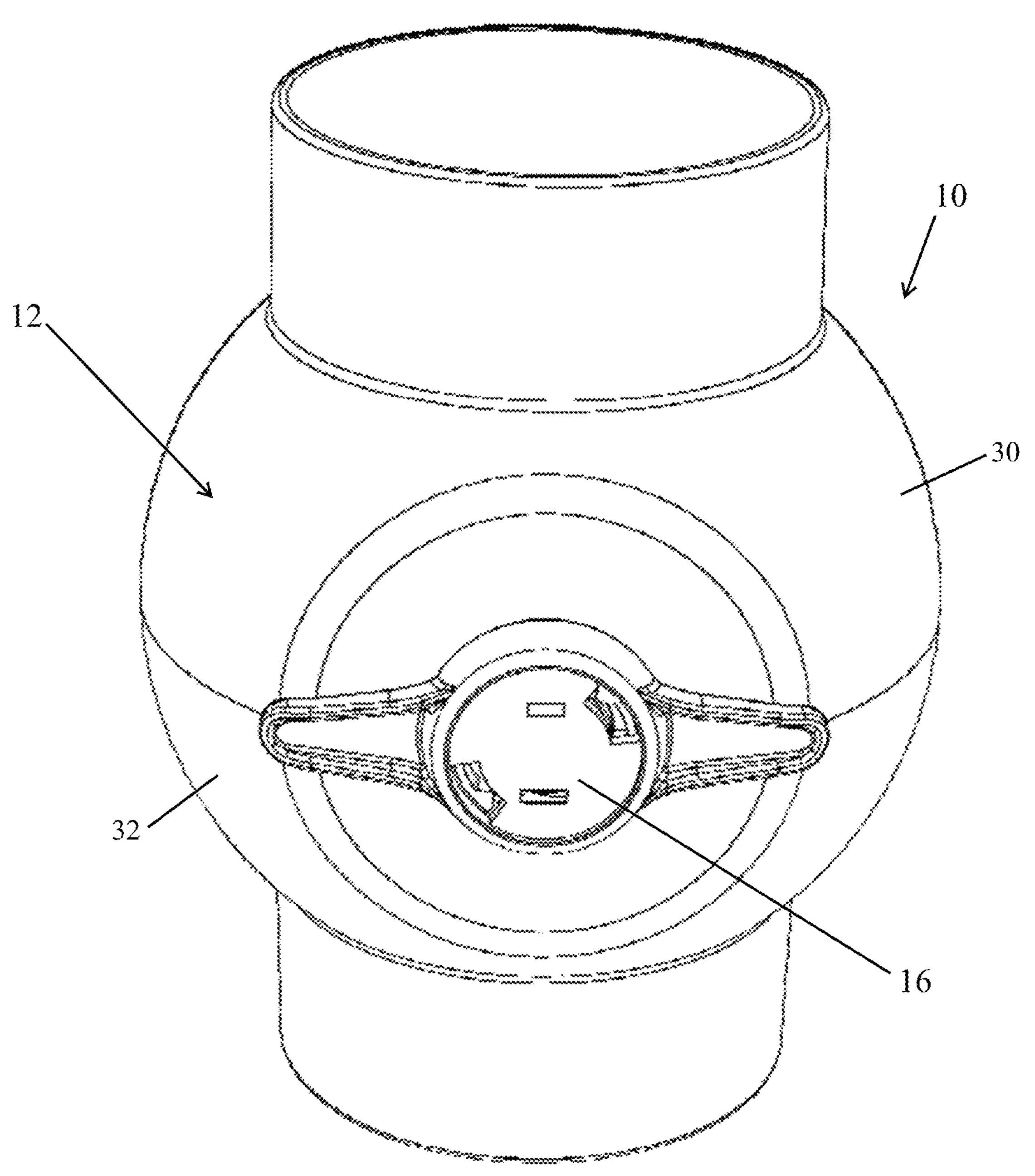
FIG. 1A is a front perspective view and FIG. 1B is a rear perspective view of a ball valve according to the disclosure.
Figure 1B:
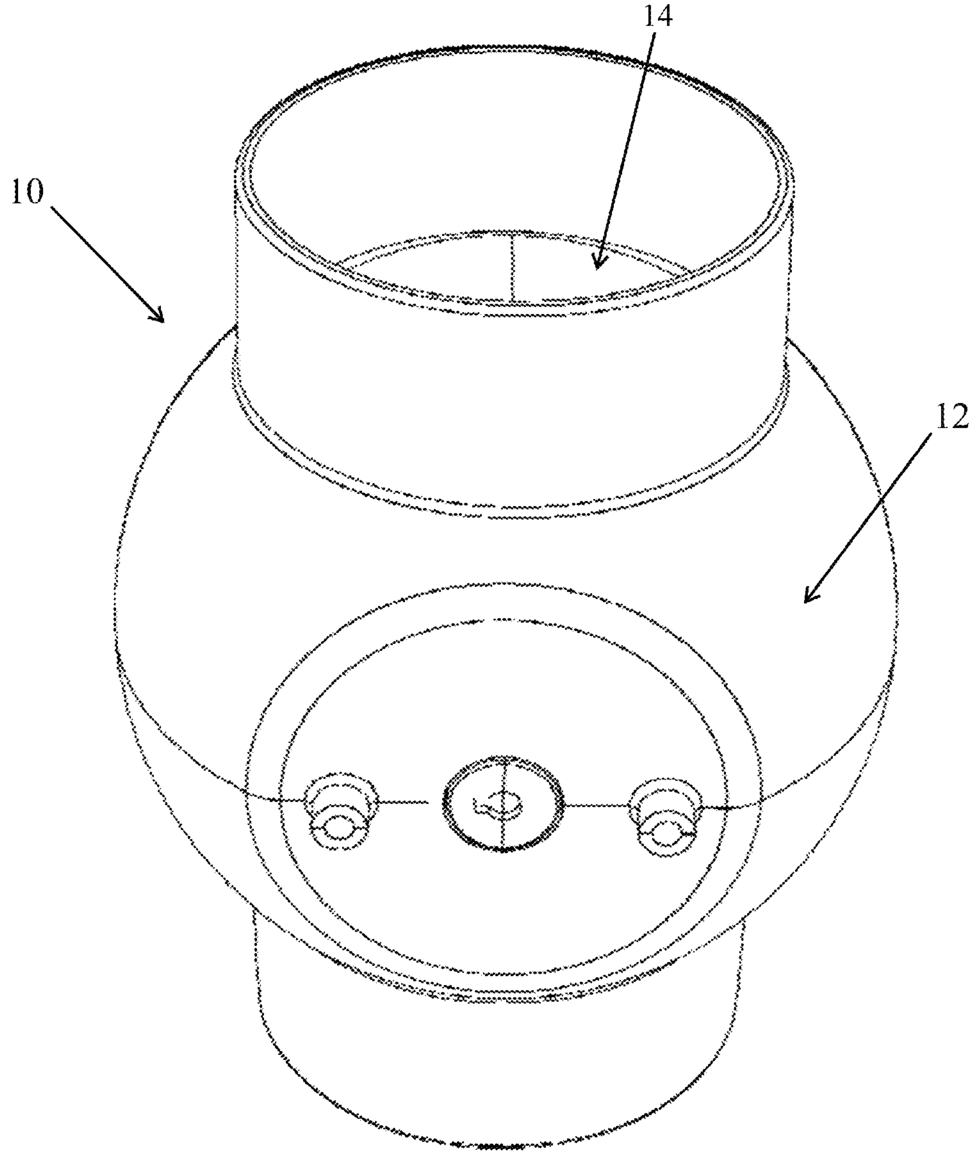
Figure 1C:
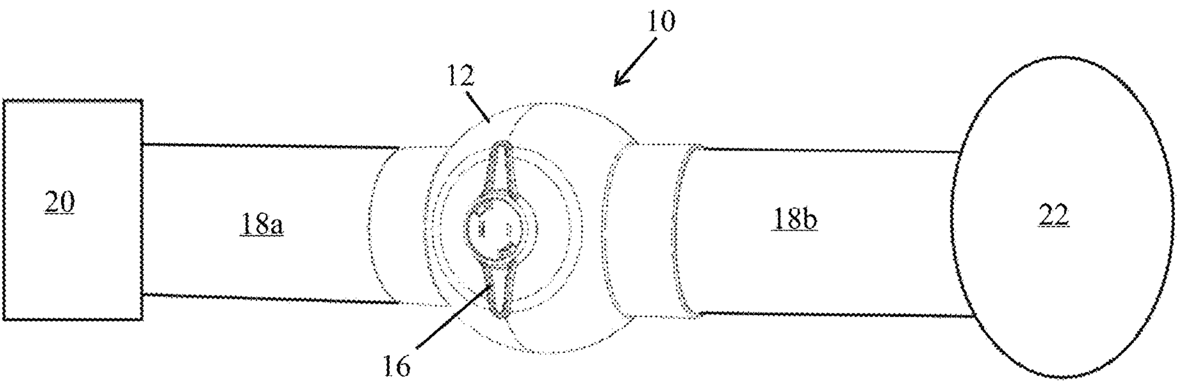
FIG. 1C is a representational showing the ball valve connected by conduit to a vacuum source and a workstation.
Figure 2A:
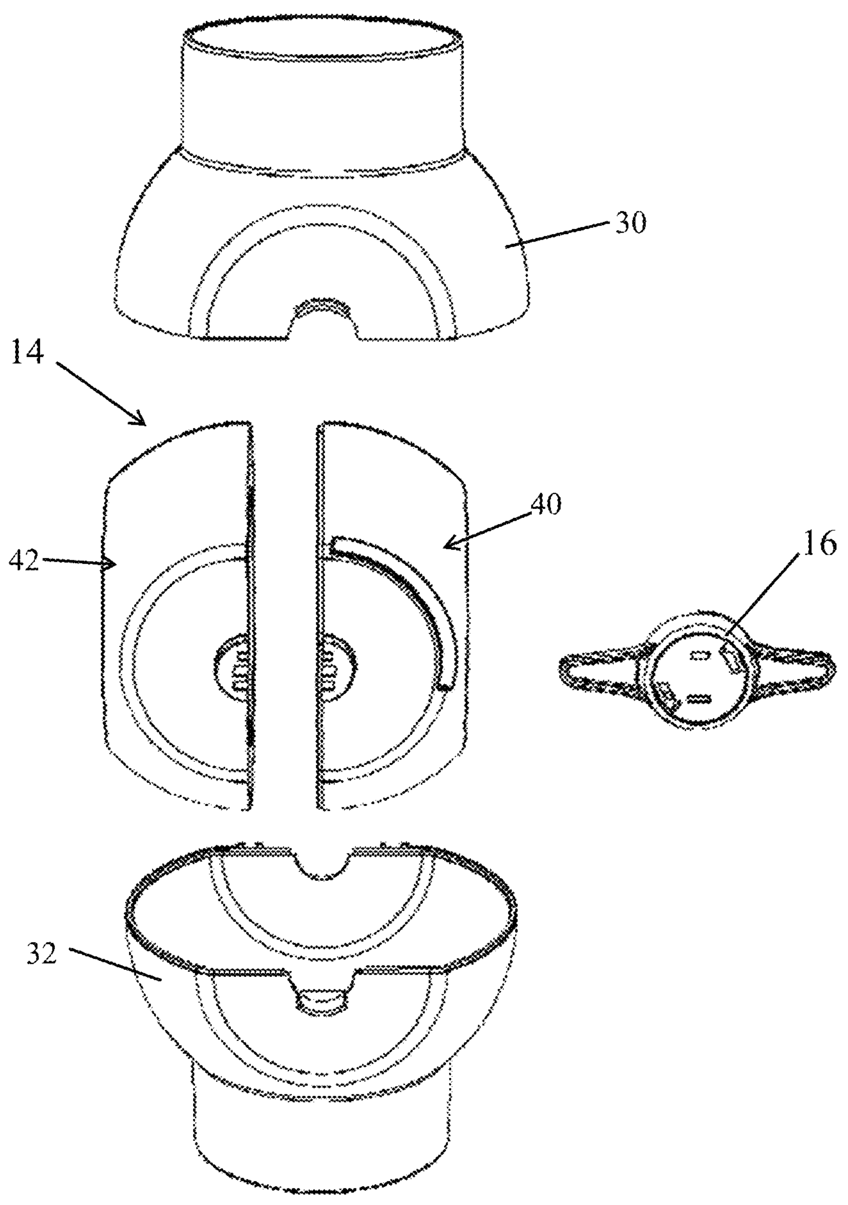
FIG. 2A is an exploded view of FIG. 1A
Figure 2B:
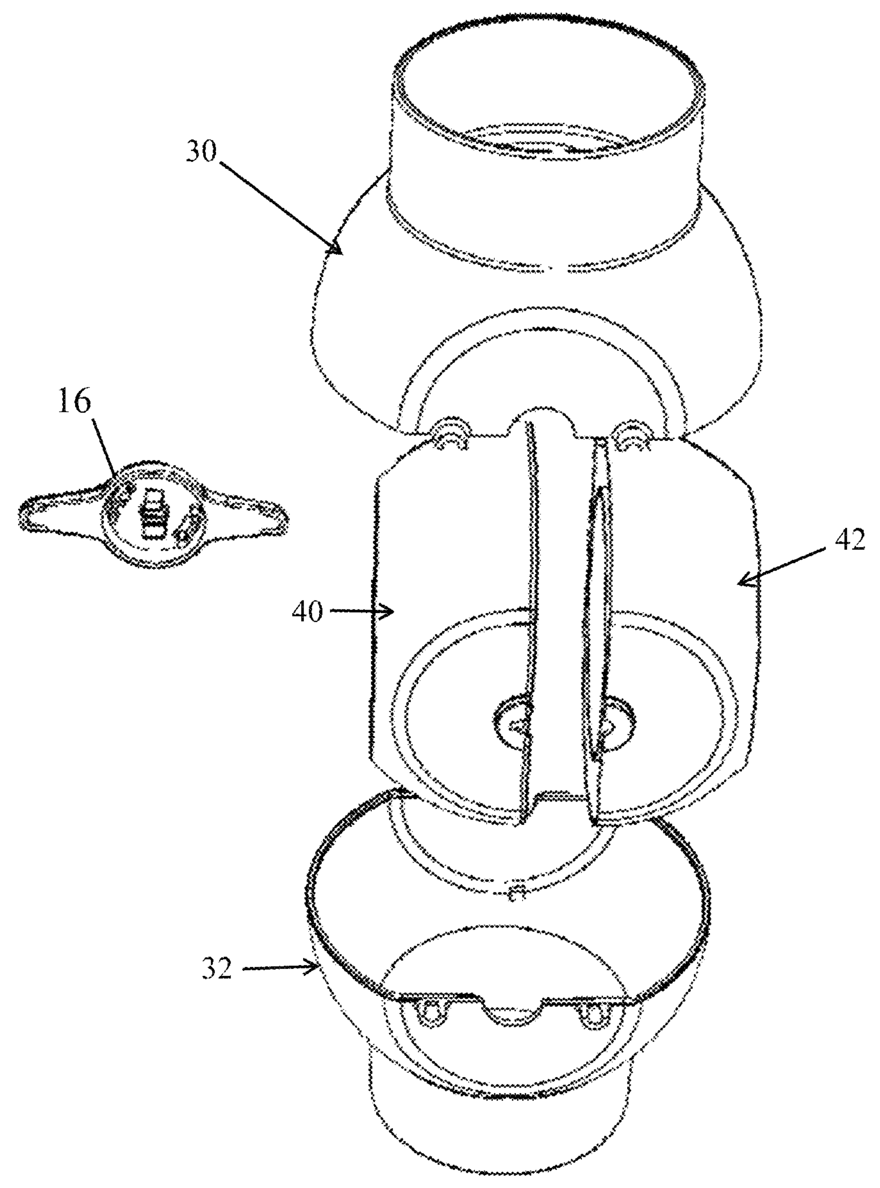
FIG. 2B is an exploded view of FIG. 1B.

With reference to the drawings, there is shown a ball valve 10 according to the disclosure. The ball valve 10 is desirably of molded plastic construction and configured for controlling air flow in conduits for workshop dust collection. A typical workshop dust collection system will utilize a 1-2 horsepower electric motor having an air flow rate of from about 300-1,400 cfm.

With initial reference to FIGS. 1A-2B, the ball valve 10 has a valve body 12, an inner sphere or ball 14, and a latch handle 16. The ball valve 10 is of simple and lightweight construction and advantageously enables the ball valve 10 to be locked in an open condition of full flow or locked in a closed condition of no flow. The ball valve 10 is also able to be adjusted between the locked/open conditions with one-hand. The ball valve 10 is configured to connect on either end to conduits 18*a* and 18*b*. Conduit 18*a* connects to a vacuum source 20 and conduit 18*b* connects to a workstation 22 to which vacuum is selectively applied by use of the ball valve 10.

Figure 3A:
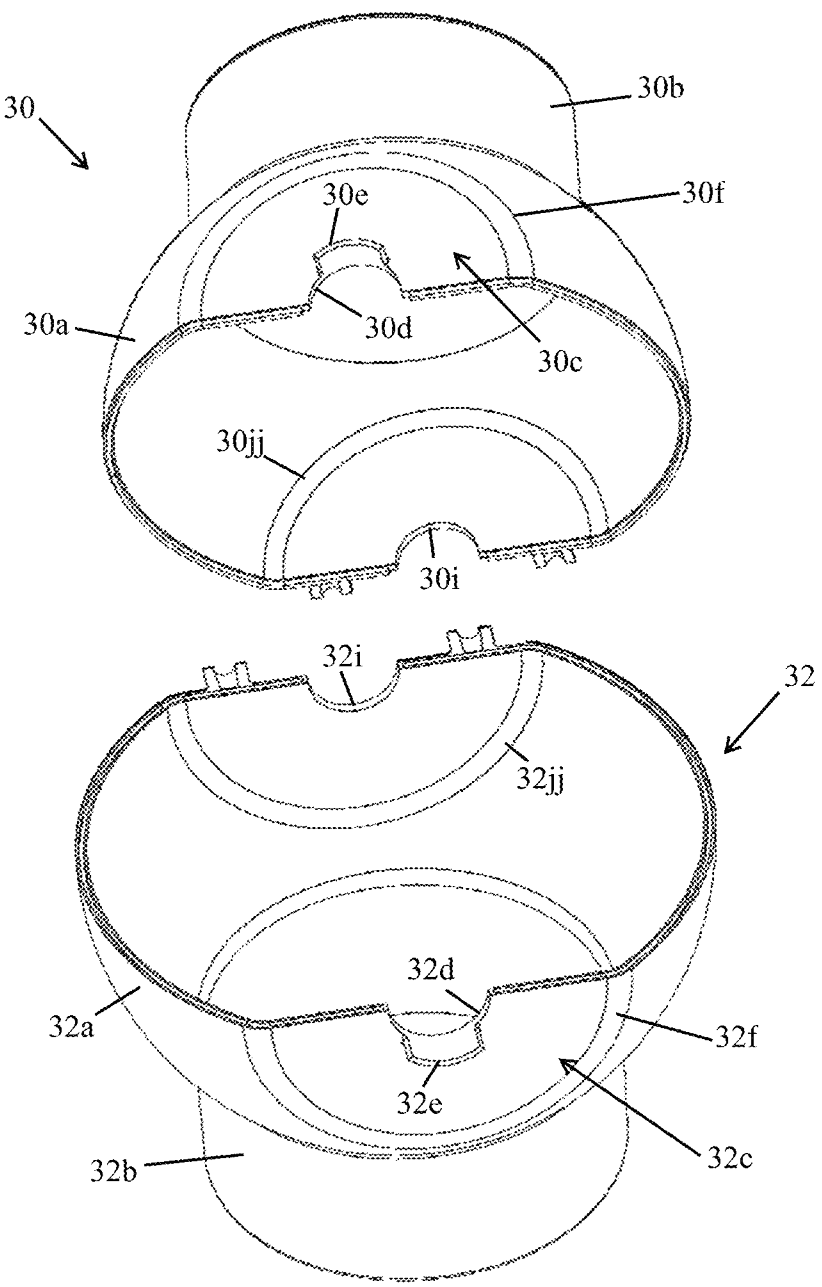
FIG. 3A is a front exploded view of a valve body and FIG. 3B is a rear exploded view thereof.
Figure 3B:
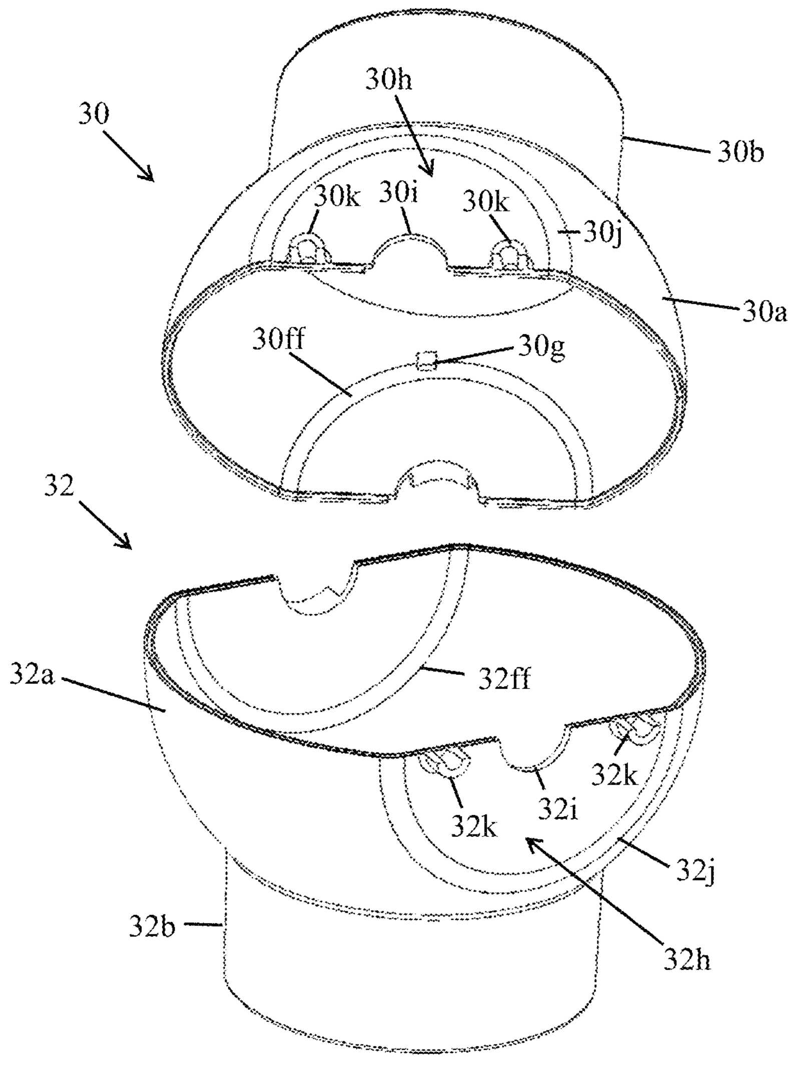

With additional reference to FIGS. 3A-3B, the valve body 12 has a first valve body part 30 that mates with a second valve body part 32. The first valve body part 30 includes a concave hollow base 30*a* with a cylindrical riser 30*b* extending from the apex of the base 30*a*. The first valve body part 30 and the second valve body part 32 fit together and rotatably receive the inner sphere or ball 14 as explained more fully below.

The hollow base 30*a* includes a front flat face 30*c* on a front side thereof with a semi-circular aperture 30*d* extending through the flat face 30*c*. A curved ledge 30*e* extends outwardly from adjacent a central portion of the aperture 30*d*. An edge 30*f* extends between the perimeter of the front flat face 30*c* and the exterior of the hollow base 30*a*, providing a front interior curved surface 30*ff* on the interior of the hollow base 30*a*. A stop tab 30*g* is formed along the curved surface 30*ff*.

The hollow base 30*a* also includes a rear flat face 30*h* on a rear side thereof opposite the front flat face 30*c*. A semi-circular aperture 30*i* extends through the flat face 30*h*. An edge 30*j* extends between the perimeter of the rear flat face 30*h* and the exterior of the hollow base 30*a*, providing a rear interior curved surface 30*jj* on the interior of the hollow base 30*a*. Optional mount surfaces 30*k* are located on the exterior of the rear flat face 30*h* if it is desired to incorporate an electric motor for operating the valve 10.

The hollow base 32*a* is substantially identical to the hollow base 30*a* except it does not include any structure corresponding to the stop tab 30*g*. The hollow base 32*a* thus includes a front flat face 32*c* on a front side thereof with a semi-circular aperture 32*d* extending through the flat face 32*c*. A curved ledge 32*e* extends outwardly from adjacent a central portion of the aperture 32*d*. An edge 32*f* extends between the perimeter of the front flat face 32*c* and the exterior of the hollow base 32*a*, providing a front interior curved surface 32*ff* on the interior of the hollow base 32*a*.

The hollow base 32*a* also includes a rear flat face 32*h* on a rear side thereof opposite the front flat face 32*c*. A semi-circular aperture 32*i* extends through the flat face 32*h*. A edge 32*j* extends between the perimeter of the rear flat face 32*h* and the exterior of the hollow base 32*a*, providing a rear interior curved surface 32*jj* on the interior of the hollow base 32*a*. Optional mount surfaces 32*k* are located on the exterior of the rear flat face 32*h* to mate with the mount surfaces 30*k* to provide mounts for incorporating an optional electric motor if desired for operating the valve 10.

Figure 4A:
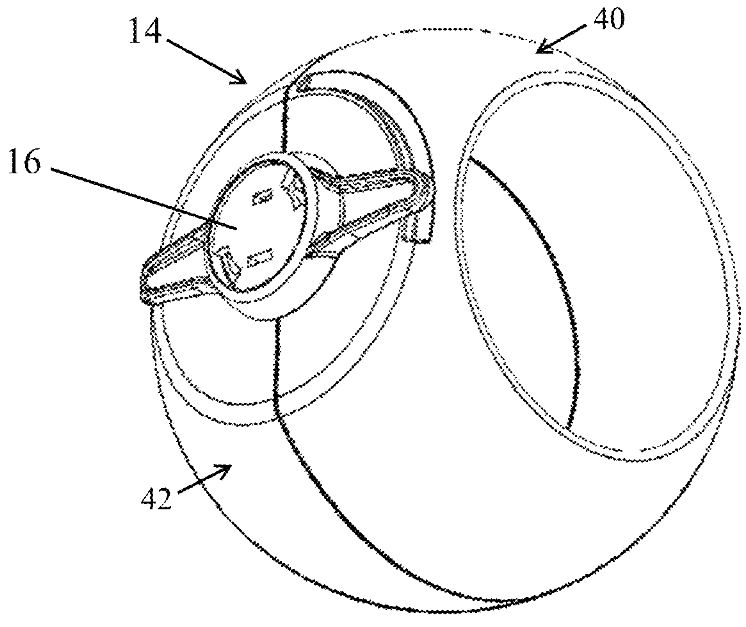
FIG. 4A is a front view of a ball with a latch handle installed thereon.
Figure 4B:
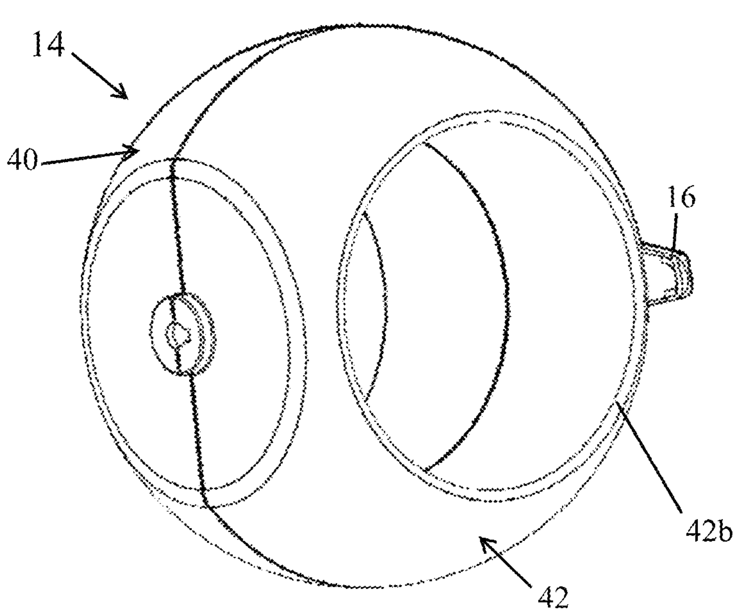
FIG. 4B is a rear view thereof.
Figure 4C:
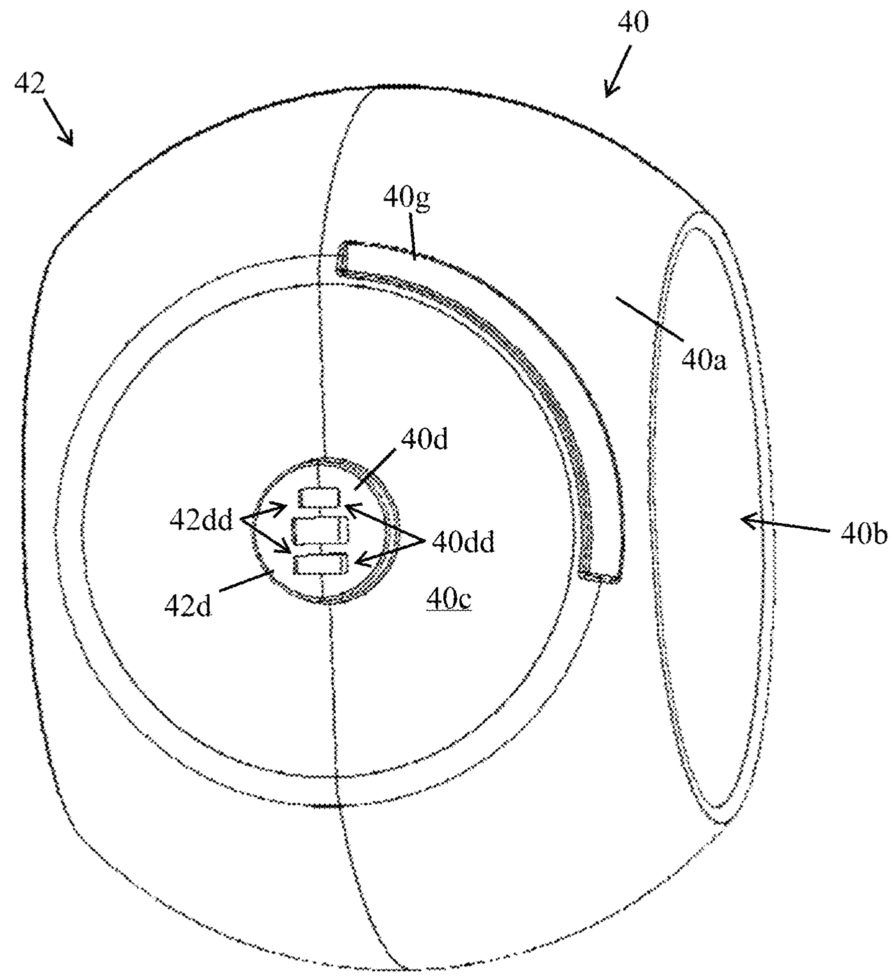
FIG. 4C shows the front of the ball without the latch handle.
Figure 5A:
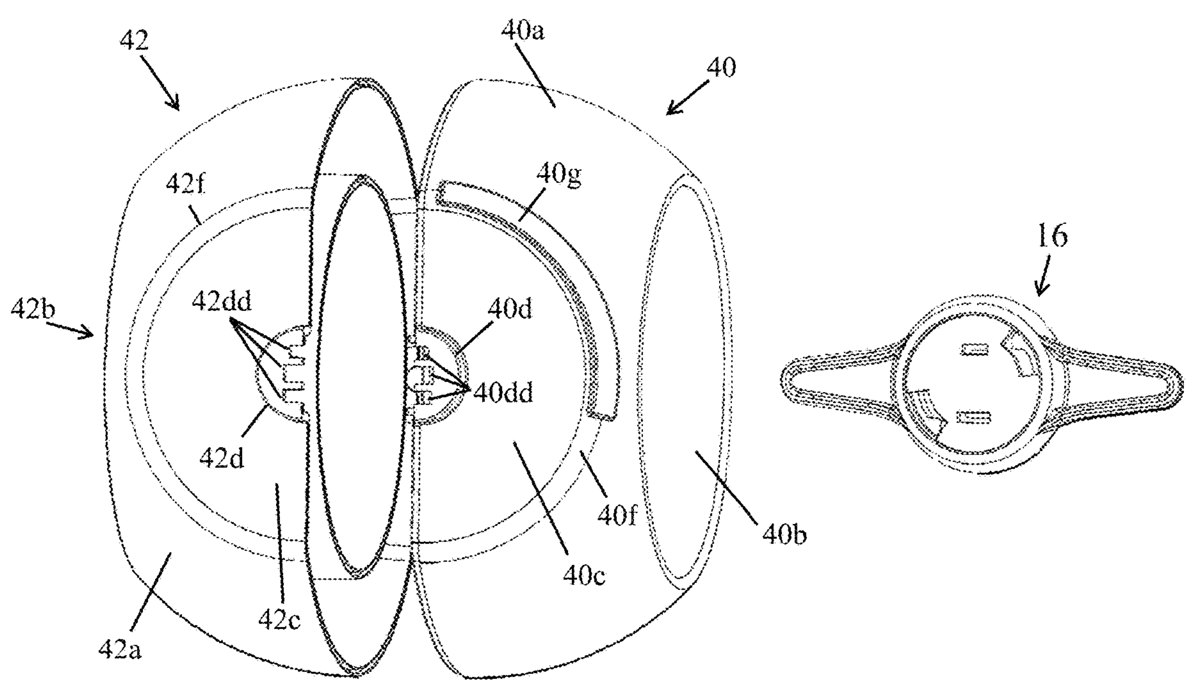
FIG. 5A is an exploded view of FIG. 4A
Figure 5B:
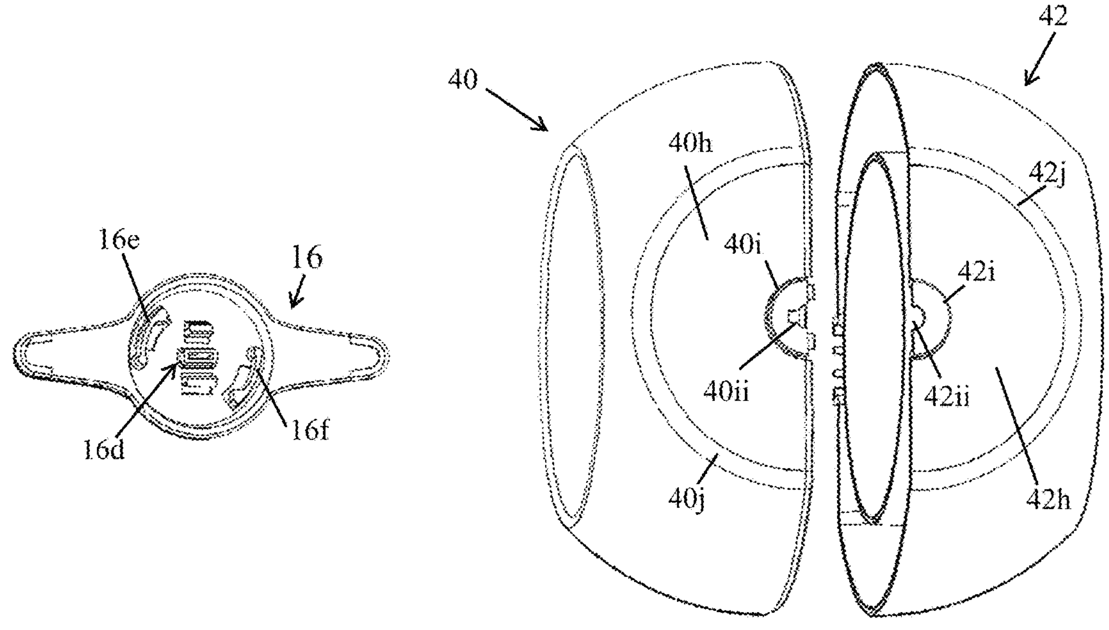
FIG. 5B is an exploded view of FIG. 4B.

Turning to FIGS. 4A-4B and 5A-5B, the ball 14 is shown with the latch handle 16 installed thereon. In FIG. 4C the latch handle 16 is removed to see the front of the assembled ball 14 provided by a first ball part 40 and a second ball part 42 which are secured together by adhesive and installed in the valve body 12. As will be noted, the ball 14 is configured to be rotatably mounted in the valve body 12, with the rotation being back and forth a quarter turn of the ball 14 for providing open and closed conditions of the ball valve 10. The latch handle 16 is grasped by a user for turning the ball 14. The ball 14 is shown as two parts, which are joined together by adhesive or the like. While two-piece construction is desirable for injection molding it will be appreciated that the ball 14 could be formed as a single part.

The first ball part 40 has a convex outer surface 40*a* surrounding an internal cylinder 40*b*. A front flat face 40*c* is formed on a front side of the convex outer surface 40*a* with a central raised semicircular stem 40*d*, to match the flat face 30*c* and aperture 30*d* of the hollow base 30*a*. The stem 40*d* includes receivers 40*dd* formed thereon. An edge 40*f* extends between the perimeter of the front flat face 40*c* and the convex outer surface 40*a*, to align with the edge 30*ff* of the hollow base 30*a*. A curved channel 40*g* is defined along a portion of the edge 40*f* and configured to receive the stop tab 30*g* of the hollow base 30*a*.

A rear flat face 40*h* is formed on a rear side of the convex outer surface 40*a* with a central raised semicircular stem 40*i*, to match the flat face 30*h* and aperture 30*i* of the hollow base 30*a*. The stem 40*i* includes an optional key feature 40*ii* formed thereon for connecting to shaft of an optional motor. An edge 40*j* extends between the perimeter of the rear flat face 40*h* and the convex outer surface 40*a*, to align with the edge 30*jj* of the hollow base 30*a*.

The second ball part 42 has a convex outer surface 42*a* surrounding an internal cylinder 42*b*. A front flat face 42*c* is formed on a front side of the convex outer surface 42*a* with a central raised semicircular stem 42*d*, to match the flat face 32*c* and aperture 32*d* of the hollow base 32*a*. The stem 42*d* includes receivers 42*dd* formed thereon. An edge 42*f* extends between the perimeter of the front flat face 42*c* and the convex outer surface 42*a*, to align with the edge 32*ff* of the hollow base 32*a*.

A rear flat face 42*h* is formed on a rear side of the convex outer surface 42*a* with a central raised semicircular stem 42*i*, to match the flat face 32*h* and aperture 32*i* of the hollow base 32*a*. The stem 42*i* includes an optional key feature 42*ii* formed thereon for connecting to a shaft of an optional motor. An edge 42*j* extends between the perimeter of the rear flat face 42*h* and the convex outer surface 42*a*, to align with the edge 32*jj* of the hollow base 32*a*.

Figure 6A:
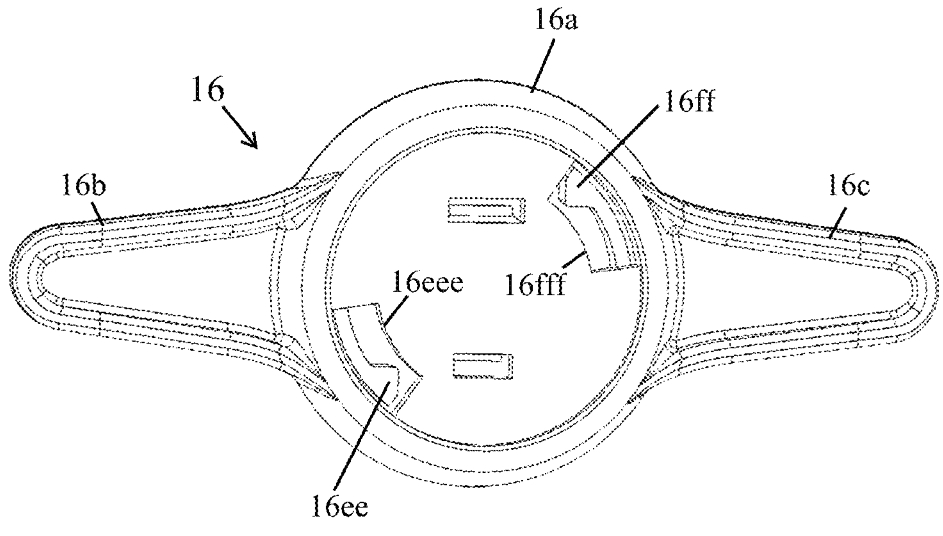
FIG. 6A is a frontal view of the latch handle and FIG. 6B is a rear view of the controller.
Figure 6B:
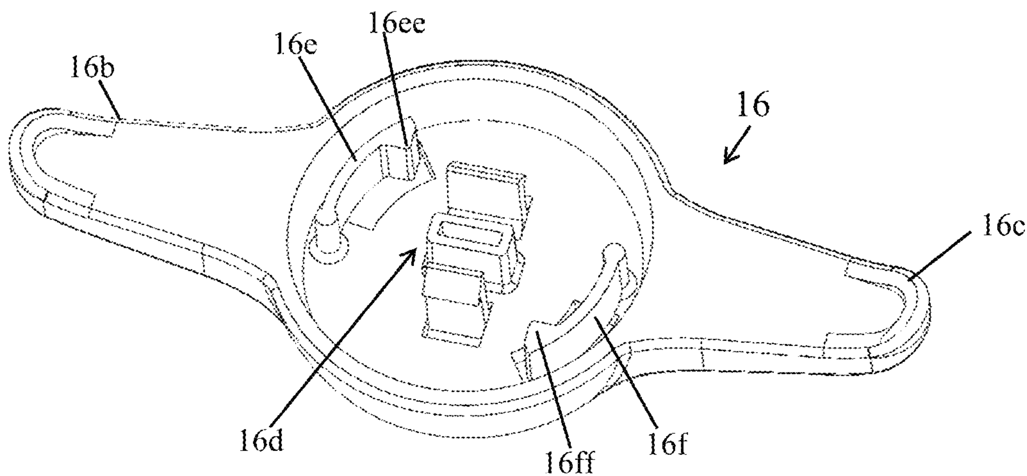

FIG. 6A is a frontal view of the latch handle 16 and FIG. 6B is a rear view of the latch handle 16. The latch handle 16 includes a central circular cap 16*a* with arms 16*b* and 16*c* extending outwardly from opposite sides of the cap 16*a*. Connectors 16*d* are located centrally on the rear of the latch handle 16 for attaching to the ball 14. In this regard, and returning to FIG. 4C, it will be seen that the receivers 40*dd* and 42*dd* combine to provide a receiver for receiving the connectors 16*d* of the latch handle 16. It will be appreciated that the latch handle 16 will press fit onto the ball 14 via the connectors 16*d* cooperating with the receivers 40*dd* and 42*dd* of the assembled ball 14.

The latch handle 16 is also configured to cooperate with the valve body 12 and the ball 14 to rotate the ball 14 one-quarter turn between the open and closed conditions with one-hand and to lock the valve in the open condition and the closed condition. To accomplish this the latch handle 16 includes curved flexible arm 16*e* and curved flexible arm 16*f* formed on the inner periphery of the central circular cap 16*a* radially spaced from one another and located to cooperate, respectively, with the radially spaced apart curved ledges 30*e* and 32*e* of the hollow bases 30*a* and 32*a*.

The arms 16*e* and 16*f* are across from one another and of molded plastic construction, as is the entirety of the latch handle 16. The arms 16*e* and 16*f* are fixed at one end and have a free end such that the arms 16*e* and 16*f* can flex under tension at their free ends to act in the manner of springs and bear against the ledges 30*e* and 32*e*. In this regard, the arm 16*e* has a detent or catch 16*ee* at its free end and the arm 16*f* has a detent or catch 16*ff* at its free end. The arm 16*e* includes an undercut 16*eee* on the cap 16*a* and the arm 16*f* includes an undercut 16*fff* on the cap 16*a*, which serve to free material from the arms 16*e* and 16*f* to enhance flexibility of the arms 16*e* and 16*f*.

Figure 7A:
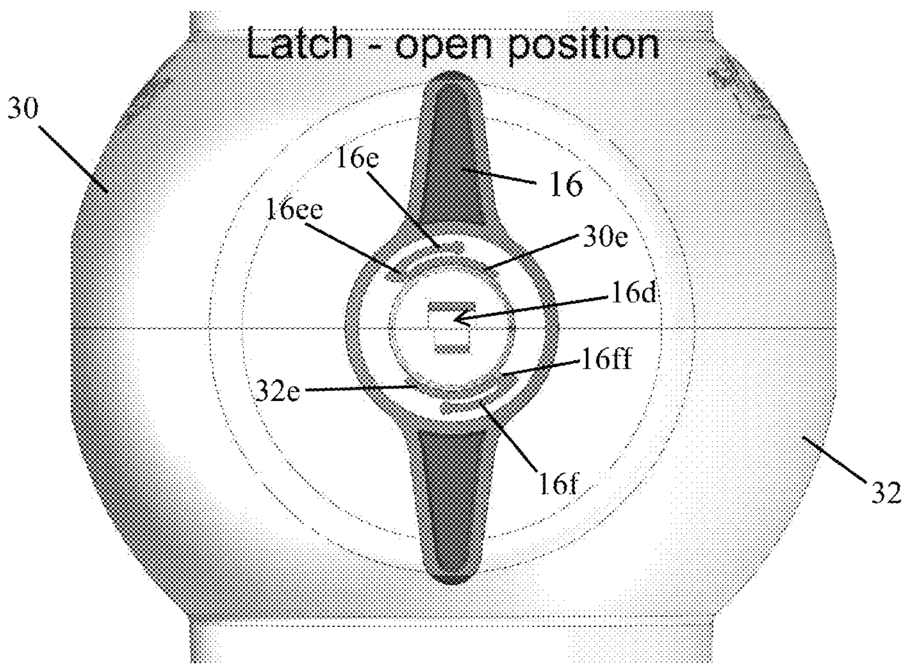
FIGS. 7A-7C are partial cut-away views depicting movement of the latch handle from an open condition of the ball valve to a closed condition of the ball valve.
Figure 7B:
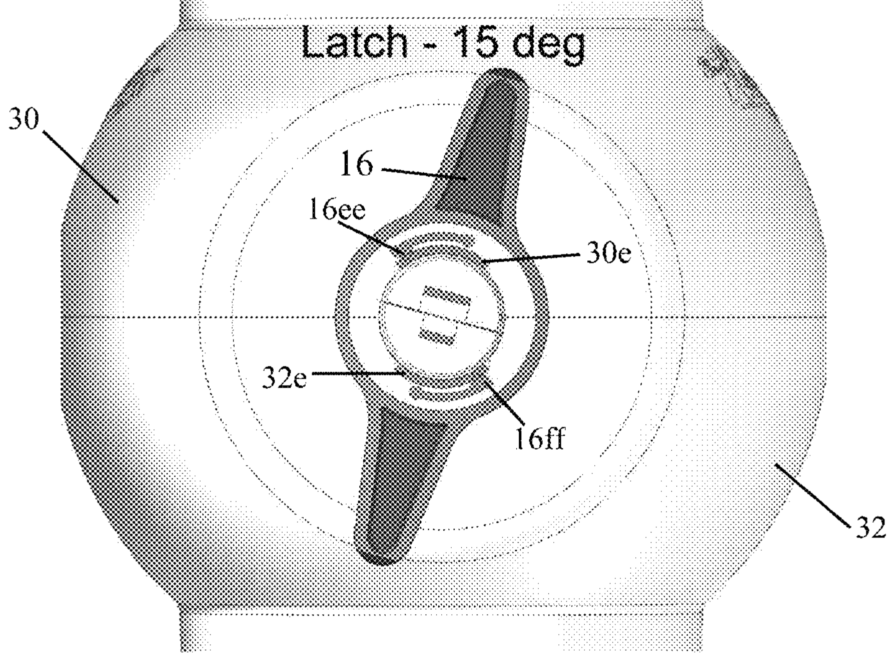
Figure 7C:
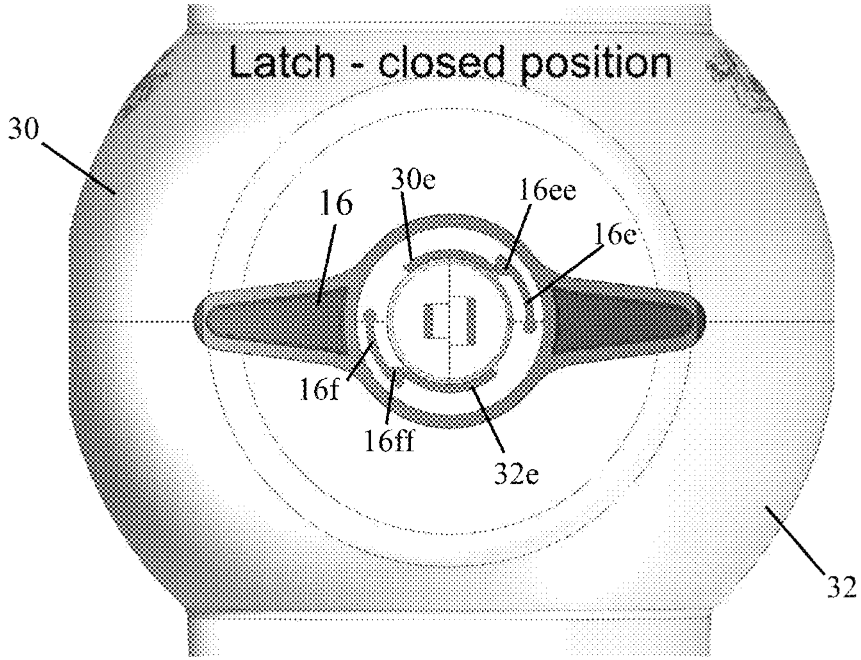

FIGS. 7A-7C show movement of the latch handle 16 from an open condition of the ball valve 10 to a closed condition of the ball valve 10. The construction of the ball valve 10 advantageously enables the ball valve 10 to be locked in the open condition and in the closed condition, and to be operated by a user with one hand.

As seen in FIG. 7A, when the ball valve 10 is in the open condition, the catch 16*ee* is at the end of the curved ledge 30*e* and the catch 16*ff* is at the end of the curved ledge 32*e*, with the spring force or flex of the arms 16*e* and 16*f* bearing against the ends of the ledges 30*e* and 32*e*. This interaction of the arms 16*e* and 16*f* and the catches 16*ee* and 16*ff* against the curved ledges 30*e* and 32*e* frictionally retain the latch handle 16 in place and locks the ball valve 10 in the open condition.

In FIG. 7B, a user has grasped the latch handle 16 and rotated the latch handle 16 clockwise to slide the catch 16*ee* past the end of the curved ledge 30*e* and the catch 16*ff* past the end of the curved ledge 32*e* to unlock the ball valve 10 from the open condition in the process of transitioning the ball valve 10 from the open condition to the closed condition. It has been observed that contact of the catch 16*ee* with the surface of the curved ledge 30*e* and the catch 16*ff* with the curved ledge 32*e* provides a light frictional resistance which desirably lightly resists rotation of the latch handle 16 and provides a good tactile feel to the user as the user rotates the latch handle 16.

In FIG. 7C, the user has continued to rotate the latch handle 16 clockwise to the closed condition of the ball valve 10. The catch 16*ee* is at the opposite end of the curved ledge 30*e* and the catch 16*ff* is at the opposite end of the curved ledge 32*e*, with the spring force or flex of the arms 16*e* and 16*f* bearing against the ends of the ledges 30*e* and 32*e*. This interaction of the arms 16*e* and 16*f* and the catches 16*ee* and 16*ff* against the curved ledges 30*e* and 32*e* frictionally retain the latch handle 16 in place and locks the ball valve 10 in the closed condition.

Figure 8A:
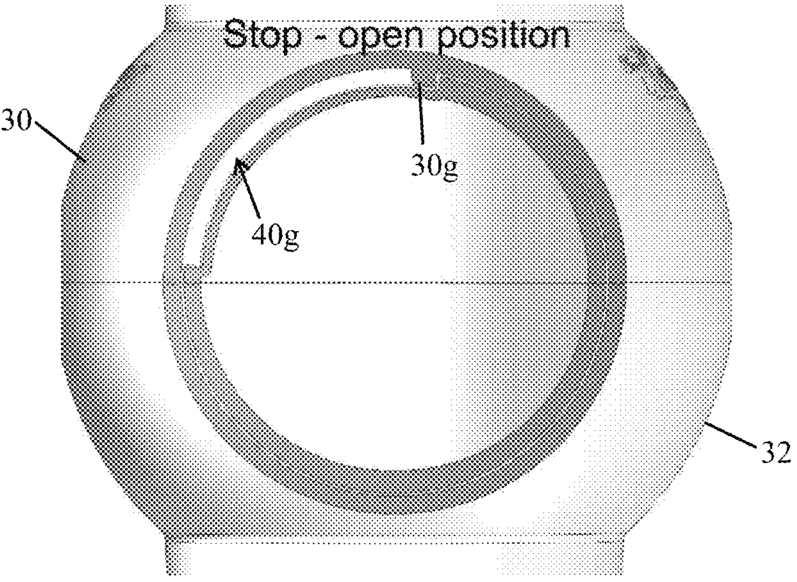
FIGS. 8A-8B are partial cut-away views depicting movement of the ball relative to the valve body from the open condition of the ball valve to the closed condition of the ball valve.
Figure 8B:
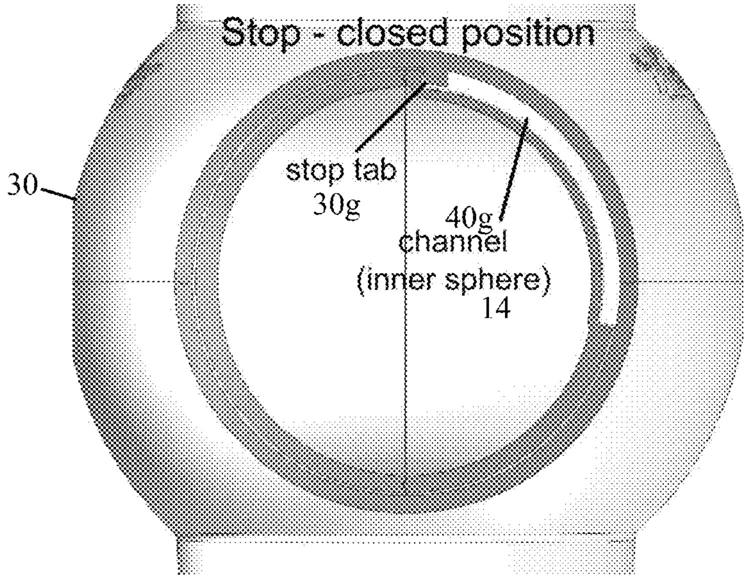

FIGS. 8A-8B show movement of the ball relative to the valve body from the open condition of the ball valve to the closed condition of the ball valve, and the structure of the ball valve 10 that limits movement of the ball valve 10 to a quarter turn (90 degrees). As will be observed, the stop tab 30*g* formed along the interior curved surface 30*ff* on the interior of the hollow base 30*a* is received by the curved channel 40*g* defined along a portion of the edge 40*f* of the first ball part 40. The length of the curved channel 40*g* is selected to provide 90 degrees of movement between the open and closed conditions of the ball valve 10, with the stop tab 30*g* bearing against the ends of the channel 40*g* to limit travel.

Accordingly, the present device advantageously provides a ball valve that locks in the open and closed positions and can be operated with one hand.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A ball valve, comprising:

a valve body including a flow inlet and a flow outlet across from the flow inlet and an aperture located on the valve body at a location between the flow inlet and the flow outlet, the aperture having a ledge adjacent the aperture and extending outwardly from the valve body;

a ball including an outer surface and flow passage through the ball, the ball including a stem positionable in the aperture for rotatably positioning the ball relative to the valve body between an open condition with the flow passage of the ball aligned with and open to and in fluid communication with the flow inlet and the flow outlet of the valve body and a closed condition with the flow passage of the ball not aligned with and not in fluid communication with the flow inlet and the flow outlet of the valve body; and a handle connectable to the ball to rotate the ball relative to the valve body, the handle including an arm having a catch at a free end thereof, wherein when the ball valve is in the open condition the catch of the arm lockingly engages a first end of the ledge, and wherein when the ball valve is in the closed condition the catch of the arm lockingly engages a second end of the ledge.

2. A ball valve, comprising:

a valve body including a flow inlet and a flow outlet across from the flow inlet and an aperture located on the valve body at a location between the flow inlet and the flow outlet, the aperture having a curved ledge adjacent the aperture and extending outwardly from the valve body;

a ball including an outer surface and flow passage through the ball, the ball including a stem positionable in the aperture for rotatably positioning the ball relative to the valve body between an open condition with the flow passage of the ball aligned with and open to and in fluid communication with the flow inlet and the flow outlet of the valve body and a closed condition with the flow passage of the ball not aligned with and not in fluid communication with the flow inlet and the flow outlet of the valve body; and a handle connectable to the ball to rotate the ball relative to the valve body, the handle including a curved flexible arm having a catch at a free end thereof, wherein when the ball valve is in the open condition the catch of the curved flexible arm lockingly engages a first end of the curved ledge, and wherein when the ball valve is in the closed condition the catch of the curved flexible arm lockingly engages a second end of the curved ledge.

3. A ball valve, comprising:

a valve body including a flow inlet and a flow outlet across from the flow inlet and an aperture located on the valve body at a location between the flow inlet and the flow outlet, the aperture having a first curved ledge adjacent the aperture and extending outwardly from the valve body and a second curved ledge adjacent the aperture and radially spaced from the first ledge and extending outwardly from the valve body;

a ball including an outer surface and flow passage through the ball, the ball including a stem positionable in the aperture for rotatably positioning the ball relative to the valve body between an open condition with the flow passage of the ball aligned with and open to and in fluid communication with the flow inlet and the flow outlet of the valve body and a closed condition with the flow passage of the ball not aligned with and not in fluid communication with the flow inlet and the flow outlet of the valve body; and a handle connectable to the ball to rotate the ball relative to the valve body, the handle including a first curved flexible arm having a catch at a free end thereof and a second curved flexible arm radially spaced from the first curved flexible arm and having a catch at a free end thereof, wherein when the ball valve is in the open condition the catch of the first curved flexible arm lockingly engages a first end of the first curved ledge and the catch of the second curved flexible arm lockingly engages a first end of the second curved ledge, and wherein when the ball valve is in the closed condition the catch of the first curved flexible arm lockingly engages a second end of the first curved ledge and the catch of the second curved flexible arm lockingly engages a second end of the second curved ledge.

* * * * *